3,526,303
AUTOMATIC BRAKE SLACK ADJUSTER
Carl L. Lodjic, Long Beach, and Donald T. McGregor, La Crescenta, Calif., assignors to Autoset Corporation, Cerritos, Calif., a corporation of California
Continuation-in-part of application Ser. No. 623,504, Mar. 9, 1967. This application Feb. 12, 1969, Ser. No. 812,942
Int. Cl. F16d 51/48, 65/60
U.S. Cl. 188—196
14 Claims

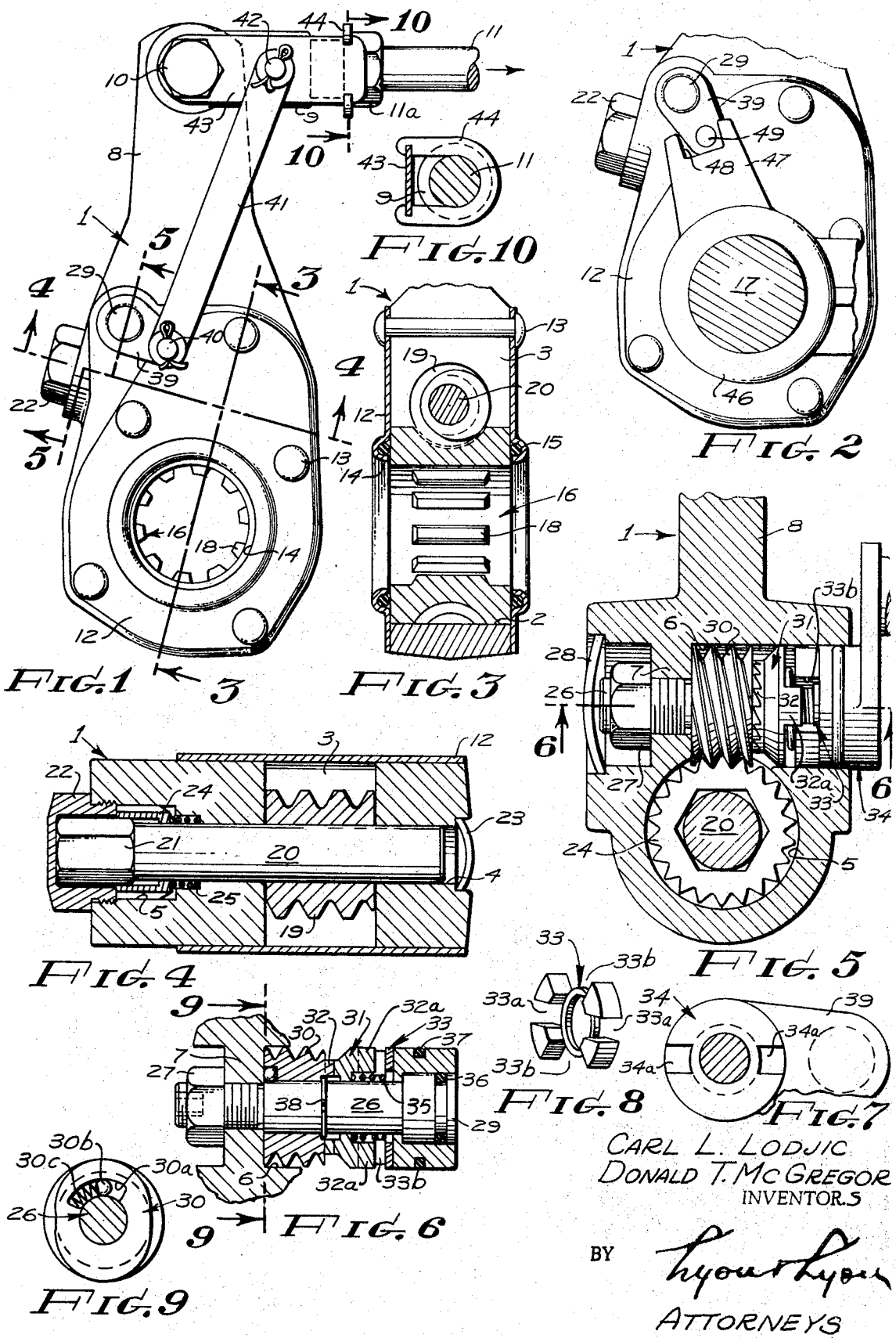

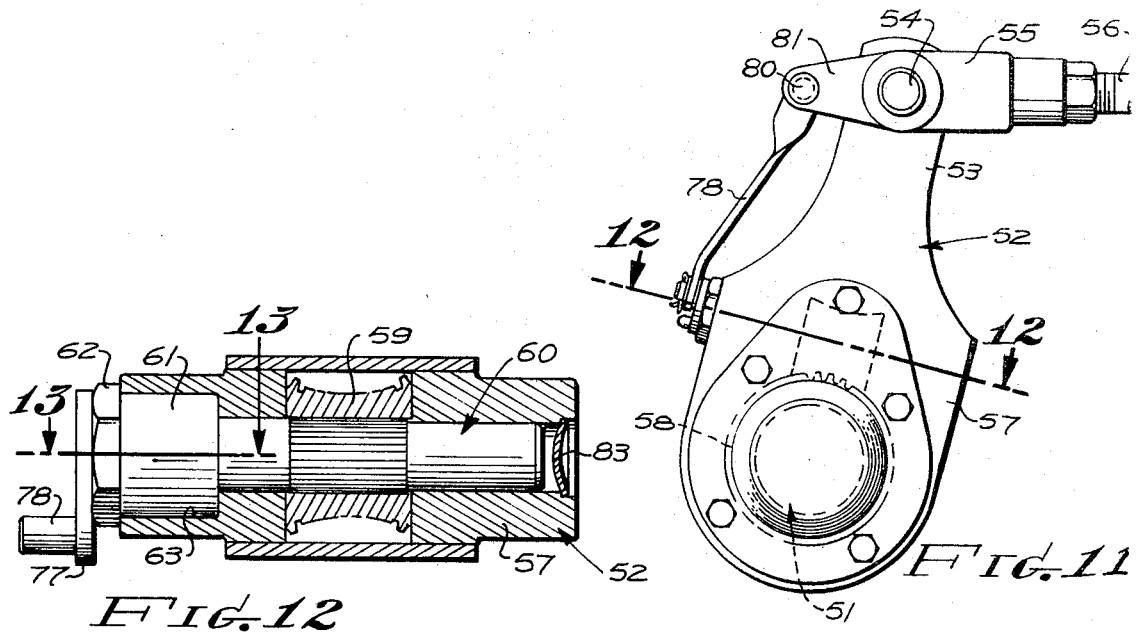
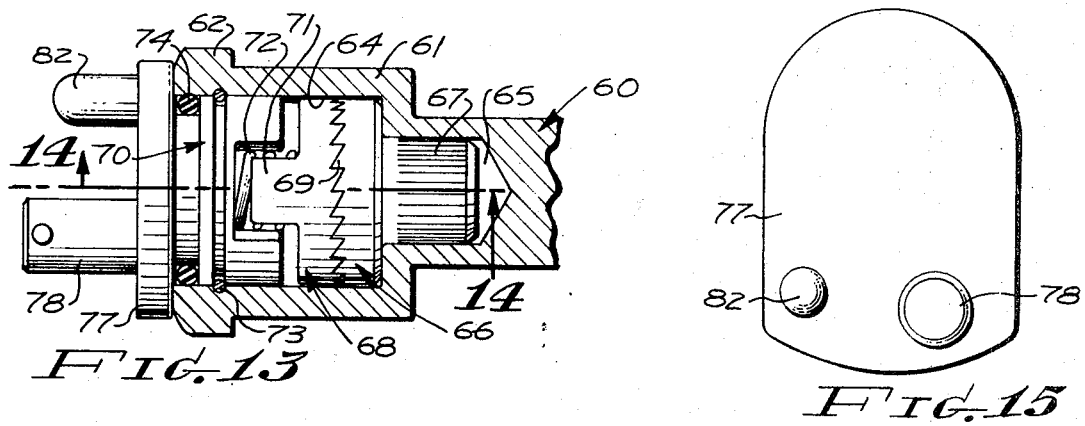
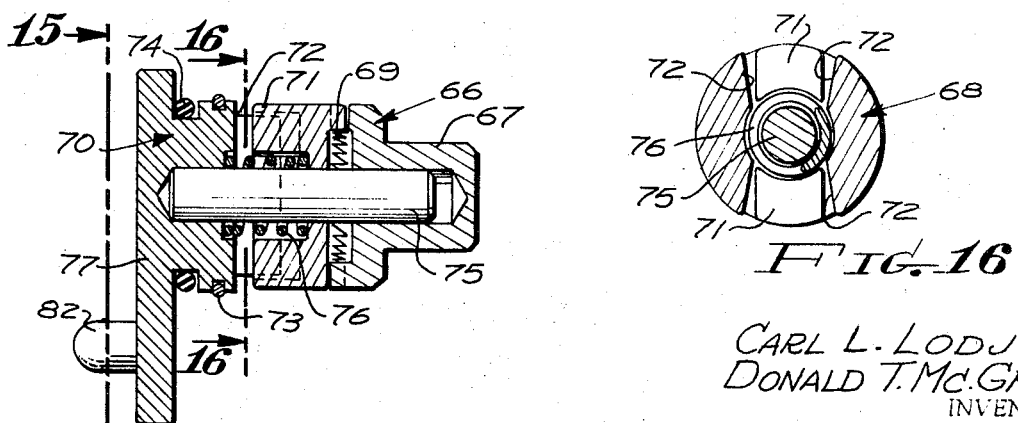
Carl L. Lodjic
Donald T. McGregor
INVENTORS.
BY Lyon & Lyon
ATTORNEYS United States Patent Office 3,526,303
Patented Sept. 1, 1970

ABSTRACT OF THE DISCLOSURE

An automatic brake slack adjuster incorporated in a lever structure interposed between the brake cam shaft and an operating lever; one embodiment of the adjuster having tandem related worm and worm gear drives actuated by a ratchet which advances the brake cam shaft by very small increments as the brake shoe is worn; and a second embodiment adapted to convert a conventional manual brake adjuster into an automatic brake adjuster both adjusters incorporating a coupling having limited free movement and a ratchet clutch arranged in tandem, one part being common to the coupling and the ratchet.

---

The present invention is a continuation-in-part of a copending application, Ser. No. 623,504, filed Mar. 9, 1967 now abandoned.

CROSS REFERENCE TO RELATED PATENTS

McGregor, 3,177,983; McGregor, 3,301,354; McGregor, 3,314,508; MacDougall, 2,481,319; MacDougall, 2,648,996; MacDougall, 2,743,793; MacDougall, 2,752,-009; MacDougall, 2,835,354.

SUMMARY OF THE INVENTION

The general purpose of the present invention is similar to the listed patents. Certain advantages are attained by the present invention as summarized in the following objects:

First to provide an automatic slack adjuster, one embodiment is a complete unit for installation between the brake operating shaft and an operating rod and which incorporates tandemly disposed worm and worm gear drives which adjust by sufficiently small increments that when an adjustment does occur, the change in brake pedal movement is virtually unnoticeable.

Second, to provide an automatic slack adjuster, another embodiment of which may be provided as a kit to convert a conventional manual slack adjuster to an automatic slack adjuster with a minimum of labor and is so arranged that the possibility of improper installation is avoided.

Third, to provide an automatic slack adjuster which incorporates a coupling permitting predetermined free play and a ratchet clutch sharing a common member, the construction being such that limited impact between the coupling members minimizes the effect of friction between the ratchet clutch.

Fourth, wherein the coupling and clutch elements are comparably enclosed and the connection between the external operating means and the internal mechanism is through a sealed oscillatory member which is restrained against axial movement so that the entrance of dirt is minimized.

DESCRIPTION OF THE FIGURES

FIG. 1 is a side view of one embodiment of the automatic brake slack adjsuter as it appears when interposed between an operating arm and the brake cam shaft, the cam shaft being omitted and the operating arm being shown fragmentarily.

FIG. 2 is a fragmentary view taken from the same aspect as FIG. 1, illustrating a modified form of the slack adjuster, in this case the brake cam shaft being shown in section.

FIG. 3 is a fragmentary sectional view taken through 3—3 of FIG. 1.

FIG. 4 is an enlarged sectional view taken through 4—4 of FIG. 1.

FIG. 5 is an enlarged fragmentary sectional view taken through 5—5 of FIG. 1.

FIG. 6 is a sectional view taken through 6—6 of FIG. 5 with the lever structure shown fragmentarily.

FIG. 7 is an inner end view of the actuating arm.

FIG. 8 is a perspective view of the clutch ring.

FIG. 9 is an end view of the indexing worm showing the one way clutch.

FIG. 10 is a sectional view taken through 10—10 of FIG. 1 showing the retainer yoke.

FIG. 11 is a side view showing a modified embodiment of the automatic slack adjuster incorporated in an otherwise conventional brake operating mechanism.

FIG. 12 is an enlarged transverse sectional view, taken through 12–12 of FIG. 11, showing the automatic slack adjusting mechanism in elevation.

FIG. 13 is a further enlarged fragmentary sectional view, taken through 13–13 of FIG. 12, showing the automatic slack adjuster removed from the brake operating mechanism, with the adjuster shaft in section and the internal mechanism in elevation.

FIG. 14 is a sectional view of the internal mechanism, taken through 14—14 of FIG. 13.

FIG. 15 is an end view, taken from 15—15 of FIG. 14.

FIG. 16 is a sectional view, taken from 16—16 of FIG. 14.

SPECIFICATION

Reference is first directed to FIGS. 1 through 10. The automatic brake slack adjuster herein illustrated is incorporated in a lever structure 1. The lever structure includes a cylindrical cam shaft worm gear cavity 2, joined at one side to a worm recess 3 which, in turn, is intersected by an adjustment shaft bore 4, one end of which is provided with a counter bore 5. The counter bore 5 intersects a right angularly extending ratchet chamber 6 which has a constriction 7 intermediate its ends. Projecting radially with respect to the cavity 2, and beyond the ratchet chamber 6, is a lever extension 8 which is joined to a clevis 9 by a clevis bolt 10. The clevis, in turn, is joined by a screwthread connection to an operating arm 11 and locked by a nut 11a. The operating arm is connected directly to or indirectly to an air cylinder, not shown.

The lever structure is provided with two flat sides determining the axial extremities of the cavity 2. These sides are covered by end plates 12 secured by rivets or other fastening means 13. The end plates extend over the extremities of the cavity 2 and are provided with openings 14 concentric with the cavity 2. The overlying portions of the end plates are provided with seals 15.

The cavity 2 receives a cam shaft worm gear 16 which receives a brake cam shaft 17 forming a part of the brake system. The cam shaft is omitted from FIG. 1, but indicated in FIG. 2. The worm gear 16 is preferably joined to the shaft 17 by a spline connection 18.

The recess 3 receives an adjustment worm 19 which engages the worm gear 16. The adjustment worm is secured to an adjustment shaft 20 journaled in the bore 4. The adjustment shaft extends into the counter bore 5 and is provided with a hexagonal head 21 which projects from the lever structure so as to be externally engageable. Normally, the hexagonal head 21 is enclosed in a screwthreaded cap 22. The opposite end of the adjustment shaft bore 4 is closed by a Welch plug 23.

Slidably mounted on the adjustment shaft 20 is an indexing worm gear 24 which has, in part, a hexagonal bore so as to fit the inner part of the hexagonal head 21 and thereby form a drive connection with the adjustment shaft 20. A spring 25 urges the indexing worm gear 24 toward the hexagonal head 21.

The ratchet chamber 6 receives a fixed shaft 26 which is screwthreaded into the constriction 7 and is provided with a lock nut 27 and a recessed end to receive an Allen wrench. The corresponding end of the ratchet chamber 6 is closed by a Welch pug 28. The opposite end of the fixed shaft is enlarged to form a cylindrical head 29.

Mounted on the shaft 26 is an indexing worm 30 which engages the indexing worm gear 24. Journaled on the shaft 26 is a ratchet ring 31. The ratchet ring and indexing worm have mating ratchet teeth 32. The opposite end of the ratchet ring is provided with a pair of axially extending clutch bosses 32a.

A coupling ring 33 is carried by the shaft and is provided with four radiating bosses forming therebetween diametrical pairs of coupling bosses or tangs 33a and 33b, one pair of which receives the coupling bosses 32a and permits limited axial movement of the ratchet ring so that the ratchet teeth may disengage.

Also mounted on the shaft 26 and fitted over the head 29 is a hub 34 having a constricted end interposed between the coupling ring 33 and the head. The hub includes axially directed coupling bosses or tangs 34a, which are slidably received in the remaining pair of coupling slots 33a or 33b.

One or both sets of slots 33a and 33b are wider than the corresponding bosses so as to provide a predetermined amount of loss motion between the hub 34 and the indexing worm 30.

A spring 35 is interposed between the rings 32 and 33 to urge the ratchet teeth into mutual engagement. A split ring 38 restrains the indexing worm against axial displacement.

The head 29 and hub 34 are provided with seal rings 36 and 37. Also the hub projects beyond the ratchet chamber and is provided with an actuating arm 39.

It is preferred that the indexing worm turn with respect to the shaft 26 in only one direction; that is, in a direction which will ultimately take up brake band slack. For this purpose, an eccentric channel 30a is formed within the worm and fitted in the channel is a ball 30b, backed by a spring 30c, as shown in FIG. 9.

Reference is now directed particularly to FIGS. 1 and 10. In the construction here illustrated, the actuating arm 39 is connected by a pivot pin 40 to a link 41 which, in turn, is connected by a pivot pin 42 to a drive plate 43. The drive plate is mounted at one side of the clevis and is secured thereto by the clevis bolt 10 and by a retainer yoke 44. The retainer yoke grips the plate at opposite edges and is locked between the clevis 9 and lock nut 11a.

Operation of the embodiment of the automatic brake slack adjuster shown in FIGS. 1 through 10 is as follows:

Referring particularly to the construction shown in FIG. 1, assuming that the brake system has been adjusted so that the operating arm 11 has a predetermined optimum length of travel, the operating arm will rock the lever structure 1 and produce a co-responding rocker movement in the brake cam shaft 17. Under this condition the lever structure operates as if it were a simple lever where the movement imparted to the actuating arm 39, drive ring 33 and ratchet ring 32 is insufficient to permit the ratchet ring 32 to advance with respect to the indexing worm 30. The indexing worm will, of course, turn slightly and produce an even less rocking movement in the indexing worm gear 24 and adjustment shaft 20. The adjustment worm 19 produces a still less rocking movement of the worm gear 16 so that for all practical purposes the cam shaft worm gear 16 may be considered as fixed with respect to the lever structure.

However, when the brake lining wears slightly, the travel of the operating arm 11 increases until the ratchet ring 32 advances one tooth of the ratchet with respect to the indexing worm 30. As a result, the cam shaft worm gear 16 and the cam shaft 17 advance to a new position compensating for the wear of the brake lining.

By reason of the tandem arrangged worm and worm gear drives, the incremental advance of the brake cam shaft 17 occurs without noticeable change in the operation of the operating arm 11 insofar as the operator of the vehicle is concerned.

It should also be noted that the internal mechanism of the slack adjuster is inherently well protected by the seals 15 bearing against the end faces of the cam shaft worm gear 16 and by the seals 37 and 36 which guard the actuating arm 39.

It should be further noted that merely by removing the cap 22, the adjustment shaft 20 may be manually operated to adjust the brakes.

It should be noted that by preselecting from a set of coupling rings 33 having channels 33a and 33b of different width, the desired amount of lost motion may be provided to meet personal preference or to match different brake systems.

Reference is now directed to FIG. 2. It is not essential that the actuating arm 39 be connected to the operating arm 11. The same effect is accomplished by a fixed sleeve 46 which may journal the brake cam shaft 17. The sleeve 46 is provided with an arm 47 terminating in a yoke 48 which engages a yoke pin 49 extending from the actuating arm 39. A predetermined amount of lost motion may be provided between the yoke and the yoke pin so as to provide the same lost motion as may be attained by the coupling ring 33 with the result that operation of the internal mechanism of the slack adjuster may be identical to the operation obtained by the arrangement shown in FIG. 1. It is, of course, not essential that the yoke 48 extends from a sleeve but may be incorporated in or extended from any fixed member which may be available.

Reference is now directed to FIGS. 11 through 16. The construction here shown is intended to be incorporated in a conventional brake operating mechanism, which comprises a shaft 51, connected as in the first described structure to a brake, not shown. Mounted on the shaft 51 is a lever structure 52, including an arm 53 which is joined by a pivotal connection 54 to a clevis 55 provided at the end of an operating rod 56.

The lever structure includes a housing 57 which surrounds the shaft 51. Contained in the housing is a worm gear 58, fastened to the shaft, and a worm 59 engageable with the worm gear. In the exercise of the present invention, as exemplified in FIGS. 11 through 16, the special shaft 60 is substituted for the conventional shaft on which the worm 59 is normally mounted. The shaft 60 is provided with an enlarged end portion 61, terminating in an end flange 62, and fitted within a counterbore 63 provided in the housing 57. The enlarged portion 61 is provided with a cylindrical socket 64 and a concentric recess 65.

Mounted at the base of the socket 64 is a fixed or inner ratchet member 66, having a stem 67, which is press fitted into the recess 65. Slidably mounted within the socket 64 is a combined ratchet and coupling member 68. The ratchet member 66 and one end of the member 68 are provided with mutually engageable ratchet teeth 69.

Disposed outwardly from the ratchet and coupling member 68 is an outer coupling member 70. The member 68 is provided with a pair of axially directed diametrically disposed bosses or tangs 71 which fit into slots 72 formed in the coupling member 70. As shown best in FIG. 16, the slots 72 are wider than the tangs 71 so as to provide a predetermined free movement between the two coupling members.

The outer coupling member 70 is provided outwardly from the slots 72 with an annular groove which receives a split retainer ring 73; that is, received in a mating groove provided in the walls of the socket 64. Outwardly from the retainer ring 73, the coupling member 70 is provided with a second annular channel which receives an O-ring 74.

The inner ratchet member 66 and the outer coupling member 70 are provided with opposed central sockets and the ratchet-coupling member 68 is provided with a central opening which slidably receives a guide pin 75. The outer coupling 70 and the member 68 are counterbored to receive a spring 76 mounted on the pin 75.

One side of the O-ring groove is bordered by a lever plate 77 which is integral with the coupling member. The lever plate 77 projects laterally and receives a crank pin 78 connected by a link 79 and pivot pin 80 to a clevis extension 81 provided on the clevis 55.

The brake slack adjusters are installed in pairs at the right and the left side of the vehicle. In order to prevent a slack adjuster from being mounted on the wrong side of the vehicle, the lever plate 77 receives a pin 82 which interferes with the link 79 if the wrong mounting is attempted.

Installation and operation of the automatic brake adjuster, shown in FIGS. 11 through 16, is as follows:

The stem of the fixed ratchet member 66 is pressed into the recess 65, the ratch-coupling member 68, guide pin 75 and spring 76 are inserted, followed by the outer coupling member 70, including the retainer or snap ring 73 and O-ring 74, until the retainer ring is received in its mating groove. The spring 76 urges the ratchet teeth 69 in mutual engagement. The entire assembly is then inserted in the lever structure causing the shaft 51 to be press fitted within the worm 59. The lever housing bore which receives the shaft 51 is closed by a suitable plug 83. Once assembled, the automatic brake adjuster normally is not intended to be removed; but if it need be, the plug 83 is removed and the shaft 51 pressed free of the worm 59.

It is preferred to provide a special link 79 for each make or model of the brake operating mechanism so as to avoid adjustment problems.

Once installed and adjusted, the outer coupling 70 and ratchet-coupling member 68 merely oscillate and the teeth do not fully disengage. As brake wear occurs, eventually, the ratchet-coupling member 68 will advance one tooth. By reason of the free play provided in the coupling, limited impact occurs with each oscillation which tends to reduce the friction between the ratchet parts to ensure dependable operation.

While particular embodiments of this invention have been shown and described, it is not intended to limit the same to the details of the constructions set forth, but instead, the invention embraces such changes, modifications and equivalents of the various parts and their relationships.

We claim:

1. The combination with a brake operating means having a brake actuating shaft, an oscillatable lever and reciprocable rod for oscillating said shaft, wherein the lever includes a housing containing at least one worm and worm gear advancing drive for said actuating shaft, of an automatic slack adjuster, comprising:
    (a) a ratchet including a first member fixed with respect to the worm of said advancing drive for rotation therewith, a second member rotatable and slidable axially with respect to said first member, said members having cooperating ratchet teeth;
    (b) coupling means including a driven element fixed with respect to said second member to rotate and slide therewith, and a driving element; said driven and driving elements having mutually engageable bosses and slots therebetween dimensioned axially to overlap within the range of sliding movement of said second ratchet member and also dimensioned to permit limited relative circumferential movement, to transmit on engagement limited impact;
    (c) a spring urging said ratchet members into mutual engagement;
    (d) and means connecting the driving element of said coupling with said reciprocable rod to effect oscillation of the driving element of said coupling thereby to advance said ratchet after said driven element is turned a predetermined amount by the driving element.

2. A slack adjuster, as defined in claim 1, wherein:
    (a) the worm of said advancing drive is rotatably mounted on a fixed shaft within a chamber formed in said lever structure;
    (b) the first member of said ratchet is integral with said worm;
    (c) the second member of said ratchet and said coupling means are journalled on said fixed shaft;
    (d) a hub is journalled on said shaft and restrained from axial displacement, extends from said coupling and is included in said connecting means;
    (e) and a seal ring is interposed between said hub and the walls of said chamber.

3. A slack adjuster, as defined in claim 1, wherein:
    (a) the worm of said advancing drive is fixed on a rotatable shaft journalled in said lever structure;
    (b) said shaft is provided with a socket therein;
    (c) said ratchet and coupling are mounted in said socket.

4. In an automatic slack adjuster for vehicle brakes wherein said adjuster is housed within a lever interposed between a brake cam shaft and an operating rod, wherein said adjuster is provided with a worm-worm gear adjustment drive and worm-worm gear indexing drives arranged in tandem and connected to said brake cam shaft to advance said brake cam shaft by small increments, the combination of a drive connection between said indexing drive and said operating rod comprising:
    (a) a shaft for said worm fixed within a chamber formed in said lever structure;
    (b) a ratchet ring rotatably and slidably movable on said shaft, said worm having mutually engageable ratchet teeth;
    (c) a spring urging said ratchet teeth into mutual engagement;
    (d) an actuating arm having a hub journaled on said shaft;
    (e) a coupling drive joining said ratchet ring and hub for rotating said ratchet ring, said coupling drive permitting axial movement of said ratchet ring to permit said ratchet ring to advance said worm when the angular movement of said operating arm exceeds a predetermined arc;
    (f) and means externally of said lever structure for effecting angular movement of said actuating arm with each application of said vehicle brakes.

5. An adjuster, as defined in claim 4, wherein:
    (a) said external means includes a pivotal connection at the extremity of said actuating arm, a pivotal connection joined to said operating rod, and a link joining said pivotal connections.

6. An adjuster, as defined in claim 4, wherein:
    (a) said external means includes a plate secured alongside said operating rod, a link extending between said plate and said actuating arm, and pivotal connections joining said link to said plate and to said actuating arm.

7. An adjuster, as defined in claim 4, wherein:
    (a) said external means includes a pair of spaced, fixed stops engageable with the extended end of said actuating arm.

8. An adjuster, as defined in claim 4, wherein:
(a) said clutch drive permits a predetermined lost motion between said hub and ratchet ring.

9. In a brake operating system including a brake shoe cam shaft, a lever structure for oscillating the cam shaft, and an operating rod for oscillating said lever structure, wherein said lever structure incorporates a worm gear attached to said cam shaft and a worm mounted on an adjustment shaft so that, on turning said adjustment shaft in a predetermined direction, said cam shaft is turned to adjust the associated shoe by taking up slack, the combination of an automatic slack adjusting means incorporated in said lever structure and comprising:
(a) an indexing worm gear mounted on said adjustment shaft;
(b) an indexing worm engaging said indexing worm gear, said indexing worm having axially directed ratchet element;
(c) an axially directed ratchet element fixed with respect to said worm;
(d) indexing means including a ratchet ring axially movable into and out of engagement with said indexing worm, yieldable means urging said ratchet element and ratchet ring into mutual engagement, a rotatable hub in coaxial relation to said indexing worm and ratchet ring, said hub having an actuating arm accessible externally of said lever structure, and coupling means interconnecting said ratchet ring and hub, said coupling means permitting a predetermined lost motion;
(e) and means connected with said actuating arm to cause movement of said ratchet ring to advance said indexing worm upon excessive oscillation of said lever structure, thereby to cause said indexing worm gear to advance said adjustment shaft.

10. A slack adjusting means, as defined in claim 9, wherein:
(a) said external means includes a pivotal connection at the extremity of said actuating arm, a pivotal connection joined to said operating rod, and a link joining said pivotal connections.

11. A slack adjusting means, as defined in claim 9, wherein:
(a) said external means includes a pair of spaced, fixed stops engageable with the extended end of said actuating arm.

12. The combination with a brake operating mechanism having a brake actuating shaft, an oscillatable lever and reciprocable rod for oscillating said shaft, wherein the lever includes a housing containing a worm gear for adjusting the brake actuator shaft to take up slack due to wear of the brake, and a worm for advancing the worm gear, of an automatic slack adjuster for turning said worm, comprising:
(a) a shaft extending through and secured to said worm for turning said worm, said shaft having a socket in one end;
(b) a ratchet including a first member fixed in said socket to turn said shaft, a second member rotatable and slidable in said socket, said members having cooperating ratchet teeth engaged and disengaged by sliding movement of said second member;
(c) a coupling including a driven element integral with the second member of said ratchet, and a driving element, said coupling elements having slots and tangs for mutual engagement dimensioned to axially overlap within the range of sliding movement of said first ratchet member and also dimensioned to permit limited free movement of said driving element before engaging and turning said driven element;
(d) a spring urging said ratchet members into mutual engagement;
(e) and means connecting the driving element of said coupling with said reciprocable rod to effect oscillation of the driving element of said coupling to advance said ratchet when said driven element is moved a predetermined distance by said driving element.

13. A slack adjuster, as defined in claim 12, wherein:
(a) said shaft is provided with a recess at the base end of said socket, and the first member is provided with a mating projection press fitted in said recess.

14. A slack adjuster, as defined in claim 12, wherein:
(a) said second ratchet member has a central bore therethrough, and said driving coupling element and said first ratchet member having opposed sockets;
(b) and a guide pin is fitted in said sockets and slidably receives said second ratchet element and said spring, said spring also being received on said pin and interposed between said driven and driving elements.

References Cited
UNITED STATES PATENTS 3,301,354  1/1967  McGregor.
3,361,230  1/1968  Hildebrand et al.

DUANE A. REGER, Primary Examiner

U.S. Cl. X.R.

188—79.5